United States Patent
Quade et al.

(10) Patent No.: US 9,373,986 B2
(45) Date of Patent: Jun. 21, 2016

(54) METHOD FOR PROVIDING SERVO MOTOR REAR BEARING SUPPORT, SPACE FOR INTERNAL ELECTRONIC PACKAGING AND IP SEALING BETWEEN MOTOR AND EXTERNALLY ATTACHED DEVICES

(71) Applicants: Edward F. Quade, Eden Prairie, MN (US); Shawn Cloran, Wauwatosa, WI (US); John S. Lindblom, Golden Valley, MN (US); Corey J. Risty, St. Pau, MN (US)

(72) Inventors: Edward F. Quade, Eden Prairie, MN (US); Shawn Cloran, Wauwatosa, WI (US); John S. Lindblom, Golden Valley, MN (US); Corey J. Risty, St. Pau, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 495 days.

(21) Appl. No.: 13/667,305

(22) Filed: Nov. 2, 2012

(65) Prior Publication Data

US 2014/0125174 A1 May 8, 2014

(51) Int. Cl.
*H02K 5/10* (2006.01)
*H02K 5/22* (2006.01)

(52) U.S. Cl.
CPC ................. *H02K 5/10* (2013.01); *H02K 11/33* (2016.01); *H02K 5/225* (2013.01)

(58) Field of Classification Search
CPC ..... H02K 5/10; H02K 11/0073; H02K 5/225; H02K 11/33
USPC ...................................................... 310/89, 91
See application file for complete search history.

(56) References Cited

U.S. PATENT DOCUMENTS

| | | | |
|---|---|---|---|
| 5,912,541 A | 6/1999 | Bigler et al. | |
| 6,107,716 A * | 8/2000 | Penketh | 310/89 |
| 6,392,322 B1 * | 5/2002 | Mares et al. | 310/88 |
| 6,794,779 B2 * | 9/2004 | Ma et al. | 310/80 |
| 6,873,076 B2 * | 3/2005 | Kaeufl et al. | 310/91 |
| 6,897,592 B2 * | 5/2005 | Suzuki et al. | 310/194 |
| 7,453,179 B2 * | 11/2008 | Innami et al. | 310/89 |
| 7,541,706 B2 * | 6/2009 | Olijnyk et al. | 310/71 |
| 7,812,487 B2 * | 10/2010 | Bi et al. | 310/64 |
| 8,007,255 B2 * | 8/2011 | Hattori et al. | 417/410.1 |
| 2003/0200761 A1 * | 10/2003 | Funahashi et al. | 62/228.4 |
| 2004/0051412 A1 * | 3/2004 | Vohlgemuth et al. | 310/89 |
| 2005/0167183 A1 * | 8/2005 | Tominaga et al. | 180/444 |
| 2006/0119197 A1 * | 6/2006 | Puterbaugh et al. | 310/87 |
| 2007/0284954 A1 * | 12/2007 | Lin et al. | 310/58 |
| 2008/0143201 A1 * | 6/2008 | Ramy et al. | 310/59 |
| 2008/0164784 A1 * | 7/2008 | Huang | 310/49 R |
| 2009/0121569 A1 * | 5/2009 | Spaggiari | 310/89 |
| 2010/0127602 A1 * | 5/2010 | Rueggen et al. | 310/68 D |
| 2010/0225189 A1 * | 9/2010 | Hirai et al. | 310/83 |
| 2012/0229005 A1 * | 9/2012 | Tominaga et al. | 310/68 B |

FOREIGN PATENT DOCUMENTS

WO  WO 2010082967 A1 *  7/2010  ............... H01R 9/07

* cited by examiner

*Primary Examiner* — Alex W Mok
(74) *Attorney, Agent, or Firm* — Fay Sharpe LLP

(57) ABSTRACT

An electric motor assembly that eliminates external component-to-component assembly seams between coupled packaging hardware that would inhibit the creation and maintenance of, for example, IP 66 and IP 67 seals while utilizing inexpensive existing motor shaft rear bearing supports and also creating additional internal electronic packaging space. The disclosure provides an assembly with a continuous (e.g., no interruptions or seams) surface area to support IP sealing of the entire packaging-to-package interface between a primary motor frame (e.g., housing) and externally attached secondary/ancillary electronic hardware.

14 Claims, 5 Drawing Sheets

METHOD FOR PROVIDING SERVO MOTOR REAR BEARING SUPPORT, SPACE FOR INTERNAL ELECTRONIC PACKAGING AND IP SEALING BETWEEN MOTOR AND EXTERNALLY ATTACHED DEVICES

BACKGROUND

The present exemplary embodiment relates to electric motors. It finds particular application in conjunction with motor assemblies including electronics modules such as control pods, and will be described with particular reference thereto. However, it is to be appreciated that the present exemplary embodiment is also amenable to other like applications.

Electric motors are used in a wide variety of applications. Many electric motors are packaged in a housing that includes drive components for controlling the operation of the motor. In some installations, an electric motor may be installed in an environment where it is exposed to environmental contaminants such as dust, moisture and/or liquids (e.g. cleaning chemicals, etc.). For example, motors used in food and beverage processing plants can be exposed to not only food products, but also cleaning chemicals that are used periodically to sanitize plant equipment.

To protect against exposure of the internal components of an electric motor assembly to such contaminants, previous motor designs have employed the attachment of secondary external packaging hardware to the rear of a motor's frame (e.g., housing). Such secondary packaging hardware is generally used to provide motor shaft rear bearing support and to create sufficient surface area to attach and IP (Ingress Protection rated) seal ancillary external electronic hardware through openings within the secondary packaging walls. The IP seal interface is therefore limited to the surface area of the secondary packaging and the ancillary electronic hardware. Therefore, interface features between any secondary/ancillary electronic hardware and the motor frame (e.g., heat sinks) require additional IP sealing, or must exist outside the protection of the IP seal. Accordingly, the prior approaches are faced with a tradeoff of the additional expense and/or space requirements of providing additional IP sealing or foregoing an IP seal for the interface features outside the primary IP seal. In addition, many prior art assemblies having housings made of multiple components that create seams in sealing surfaces between the housing and any secondary packaging. Such seams prevent effective sealing.

BRIEF DESCRIPTION

The present disclosure provides an electric motor assembly that eliminates external component-to-component assembly seams between coupled packaging hardware that would inhibit the creation and maintenance of, for example, IP 66 and IP 67 seals while utilizing inexpensive existing motor shaft rear bearing supports and also creating additional internal electronic packaging space. The disclosure provides an assembly with a continuous (e.g., no interruptions or seams) surface area to support IP sealing of the entire packaging-to-package interface between a primary motor frame (e.g., housing) and externally attached secondary/ancillary electronic hardware.

In accordance with one aspect, a motor assembly comprises a tubular motor housing having an interior chamber extending between first and second ends, a motor unit received in a first end of the chamber, the motor including an output shaft having opposite axial ends, with at least one of the axial ends of the output shaft terminating within the housing, a bearing support received in the second end of the chamber, the bearing support including a bearing supporting the axial end of the output shaft terminating within the housing, the bearing being spaced axially inward from the second end of the chamber, and an electronics module supported on an exterior surface of the housing. The housing has a continuous planar sealing surface surrounding an opening extending from an exterior of the housing to the interior chamber through which the electronics module extends for connection to at least one of the motor or the bearing support, the continuous planar sealing surface is adapted to interface with a corresponding sealing surface of the electronics module to form a seal therebetween.

A sealing element, such as a gasket or the like, can be interposed between the housing and the electronics module. The seal between the housing and the electronics module can be an IP 66 rated seal or an IP 67 rated seal, for example. A heat transfer material can be included between the housing and the electronics module and fully surrounded by the sealing element whereby the heat transfer material is shielded from contaminants by the sealing element.

A sealing element can also be interposed between the bearing support and the housing. The motor can include an electric motor. The housing can include a plurality of longitudinally extending grooves on an exterior surface thereof. The housing can include a flange, and the flange can include the continuous planar sealing surface. The electronics module can be fixed to the housing with at least one fastener, such as a bolt. The housing can be a diecast metal, for example. The bearing support can be tubular and closely received within the housing with the bearing being supported at a first end of the bearing support and the bearing support further comprising an electronics cavity in which electronic components can be mounted. The bearing can be positioned axially closer to a longitudinal center of the tubular housing than either end of the tubular housing, and/or axially coextensive with a middle portion of the tubular housing.

In accordance with another aspect, a modular motor assembly comprises a housing, a motor module supported in the housing, the motor module including an output shaft supported for rotation, a bearing support received in the housing and the bearing support having a bearing supporting an axial end of the output shaft within the housing, and an electronics module supported on an exterior surface of the housing. The housing has a continuous planar sealing surface surrounding an opening extending from an exterior of the housing to an interior of the housing through which the electronics module extends for connection to at least one of the motor module or the bearing support, the continuous planar sealing surface adapted to interface with a corresponding sealing surface of the electronics module to form a seal therebetween.

The modular motor assembly can further include a sealing element, such as a gasket, interposed between the housing and the electronics module. The seal formed between the housing and electronics module can be IP 66 rated or IP 67 rated. The assembly can further include a heat transfer material between the housing and the electronics module fully surrounded by the sealing element whereby the heat transfer material is shielded from contaminants by the sealing element.

In accordance with another aspect, a bearing support for an associated motor assembly having a tubular housing in a motor including a motor shaft supported within the housing, the bearing support comprising a support housing having a tubular portion thereof insertable into the tubular housing of the associated motor assembly, the support housing having a mounting flange for securing the support housing to the tubular housing of the associated motor assembly, and a bearing supported by the support housing in spaced apart relation to the mounting flange for supporting an end of the motor shaft of the motor of the associated motor assembly within the tubular housing of the associated motor assembly.

DETAILED DESCRIPTION

Figure 1:
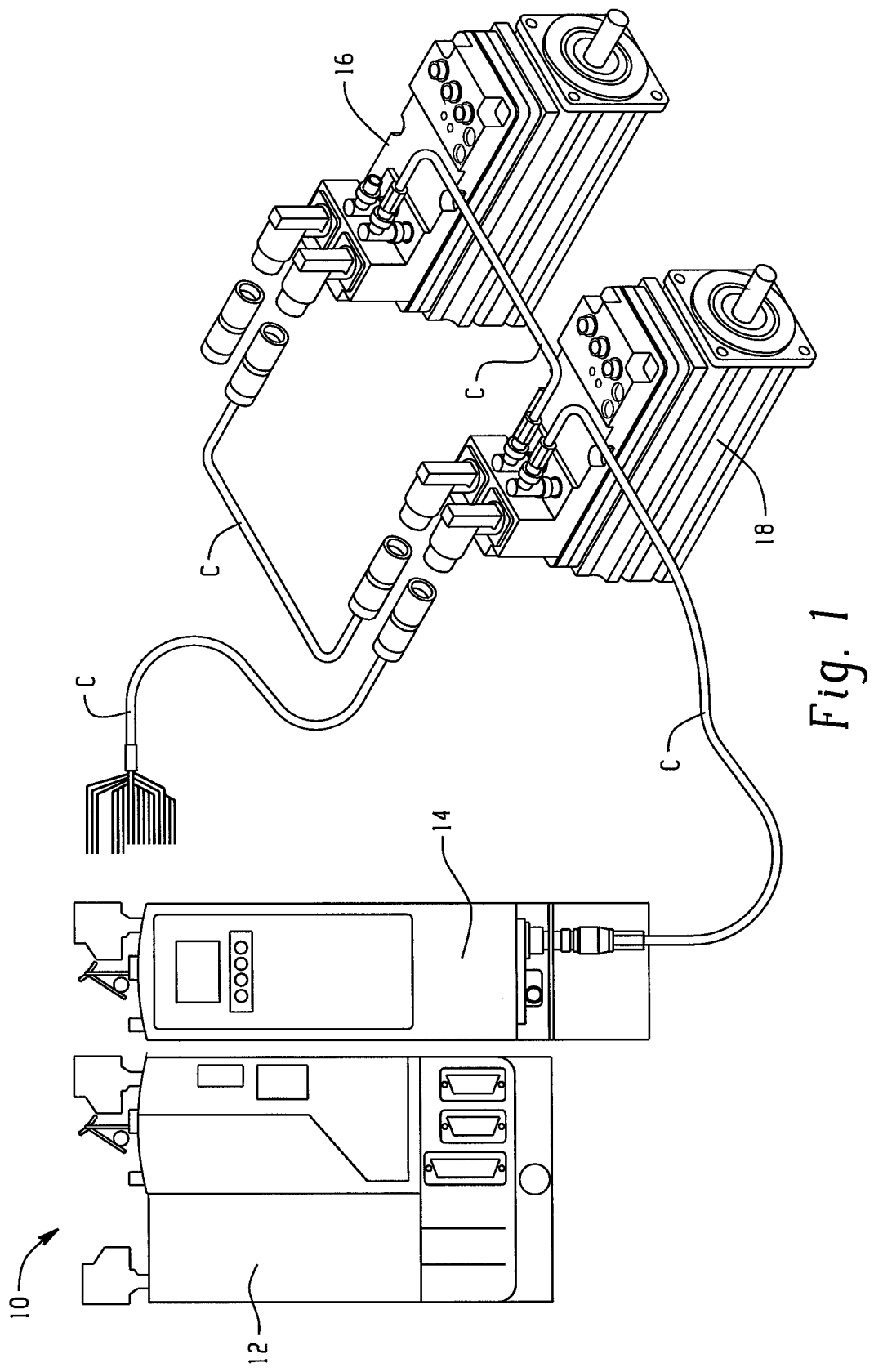
FIG. 1 is a schematic diagram of an exemplary integrated drive-motor system including a drive-motor assembly in accordance with the present disclosure.

With reference to FIG. 1, an integrated drive-motor system is generally identified by reference numeral 10. The system 10 includes an integrated control module 12, power interface module 14, and a pair of drive-motor assembles 16 and 18. Although the system 10 includes two drive-motor assemblies, additional (or a single) drive-motor assemblies could be provided. Each of the drive-motor assemblies 16 and 18 are connected via hybrid cables C to each other, and to the integrated control module 12 and power interface module 14. The hybrid cables can include both a power cable and a motion network cable for respectively supplying power and control information to the drive-motor assemblies 16 and 18. The system 10 is illustrative of one exemplary type of installation of the drive-motor units of the present disclosure, and it will be appreciated that the drive-motor units can be used in a variety of other applications.

Figure 2:
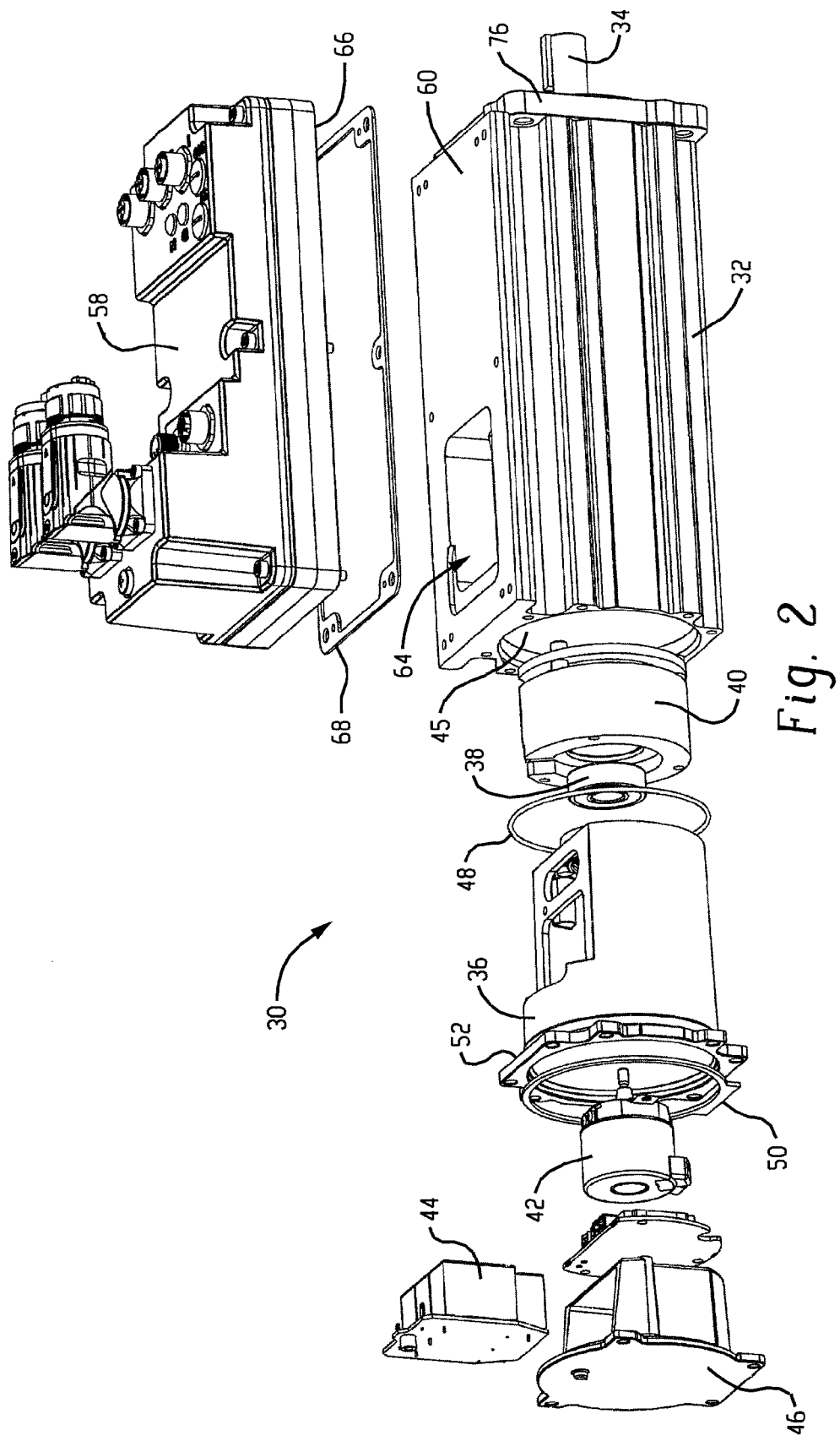
FIG. 2 is an exploded perspective view of the motor assembly of FIGURE

Turning to FIG. 2, an exemplary drive-motor assembly 30 is illustrated with its various components exploded out for viewing. The assembly 30 includes a tubular motor housing 32 having a plurality of longitudinally extending grooves/ridges, a motor unit having an output shaft 34 (the motor unit is not visible in FIG. 2), and a bearing support 36 for supporting an end of the output shaft 34 within the housing 32. The bearing support 36 supports a bearing 38 that, as will be described below, is adapted to support an end of the motor output shaft 34 within the housing 32. Also shown is a brake 40 for selectively braking the output shaft 34, an encoder 42 for determining speed and/or angular position of the output shaft 34, and internal electrical components 44.

Each of the above-described components are supported within a cavity 45 of the tubular motor housing 32 when assembled. An end cap 46 encloses the open end of the housing 32. It will be appreciated that a sealing element in the form of an O-ring 48 is provided for sealing the bearing support 36 to the housing 32. Likewise, a gasket 50 is provided for sealing the end cap 46 to a flange 52 of the bearing support 36. An electronics module (drive) 58 including a plurality of connectors for coupling the assembly 10 to other components is supported on an exterior surface of the tubular motor housing 32.

Figure 3:
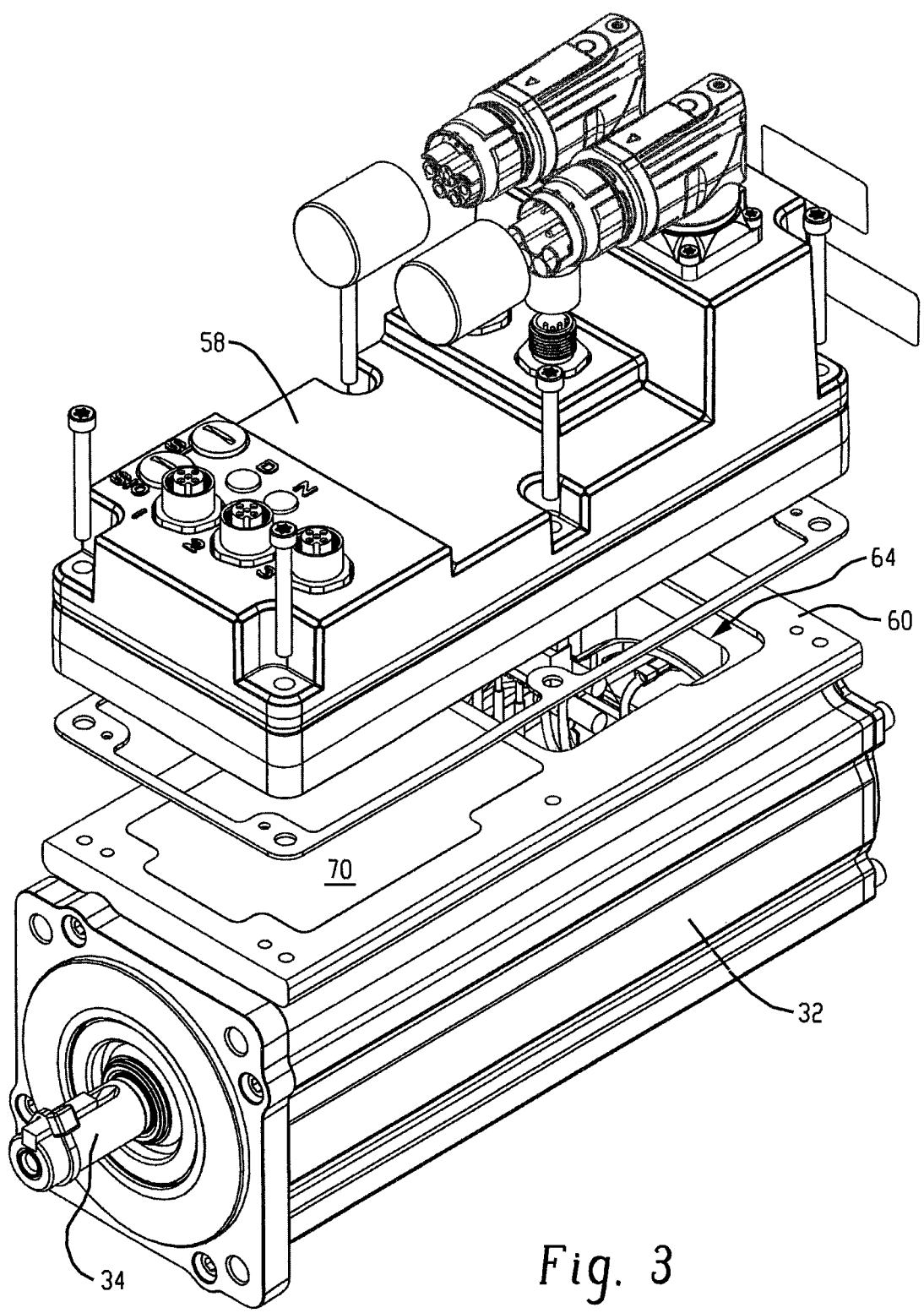
FIG. 3 is a partially assembled perspective view of the motor assembly of FIG. 2.

With additional reference to FIG. 3, it will be appreciated that the electronics module 58 is supported on an exterior, generally planar surface (e.g., flange) of the housing 32. In this regard, the housing 32 has a continuous planar sealing surface 60 surrounding an opening 64 extending from an exterior of the housing 32 to the interior chamber 45 through which the electronics module and/or connecting wires or cables extend for connection to at least one of the components within the housing 32. The sealing surface 60 extends generally about the entire periphery of the top surface of the housing 32 such that a major portion of the top surface of the housing is within the sealing surface 60. The sealing surface 60 is adapted to interface with a corresponding continuous sealing surface 66 on the underside of the electronics module 58 (see FIG. 2), and a gasket 68 or other sealing element is interposed between the housing 32 and the electronics module 58 to form the seal. This arrangement places a large percentage of the top surface of the housing 32, as well as the opening 64 within the seal. It will be appreciated that in one exemplary configuration, the seal arrangement of the present disclosure can be an IP 66 or IP 67 rated seal. It should further be appreciated that the sealing surface, while continuous, need not necessarily be planar.

In addition, a heat transfer material 70, such as a thermal paste or pad or the like, can be interposed between the electronics module 58 and the housing 32 to facilitate transfer of heat therebetween. In the exemplary embodiment, the heat transfer material 70 is fully surrounded by the gasket 68, whereby the heat transfer material is shielded from contaminants by the gasket 68. Accordingly, unlike prior solutions, the heat transfer material 70 is protected from exposure to contaminants such as dust, moisture and liquids and, thus, shielded from being inadvertently removed during routine cleaning operations.

As compared to a conventional motor-drive assembly, the housing 32 of the motor-drive assembly 30 is generally longer but the overall package size general remains the same since electronics space is created in the housing 32. The longer length is due, at least in part, to the seal arrangement between the electronic module 58 and the housing 32 being configured to maximize the area protected (e.g., sealed) by the seal therebetween. To accommodate this improved sealing arrangement without having to redesign other existing components (e.g., the motor, output shaft, etc.), the present disclosure further utilizes the bearing support 36 that can be inserted into the rear open end of the housing to provide support for the internal end of the output shaft 34.

Figure 4:
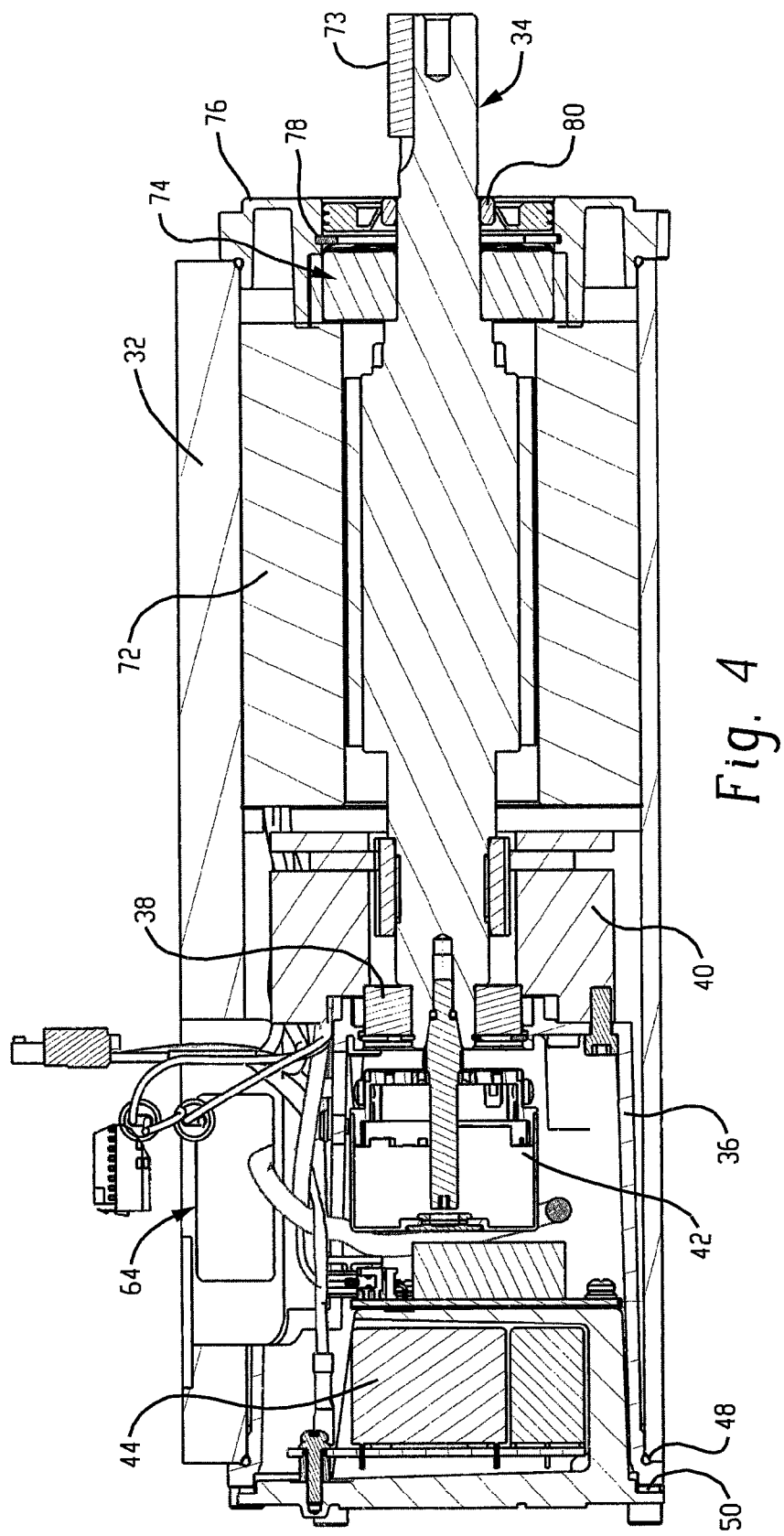
FIG. 4 is a cross-sectional view of a motor housing portion of the motor assembly of FIG. 2 taken through the axis of rotation of an output shaft of the motor.
Figure 5:
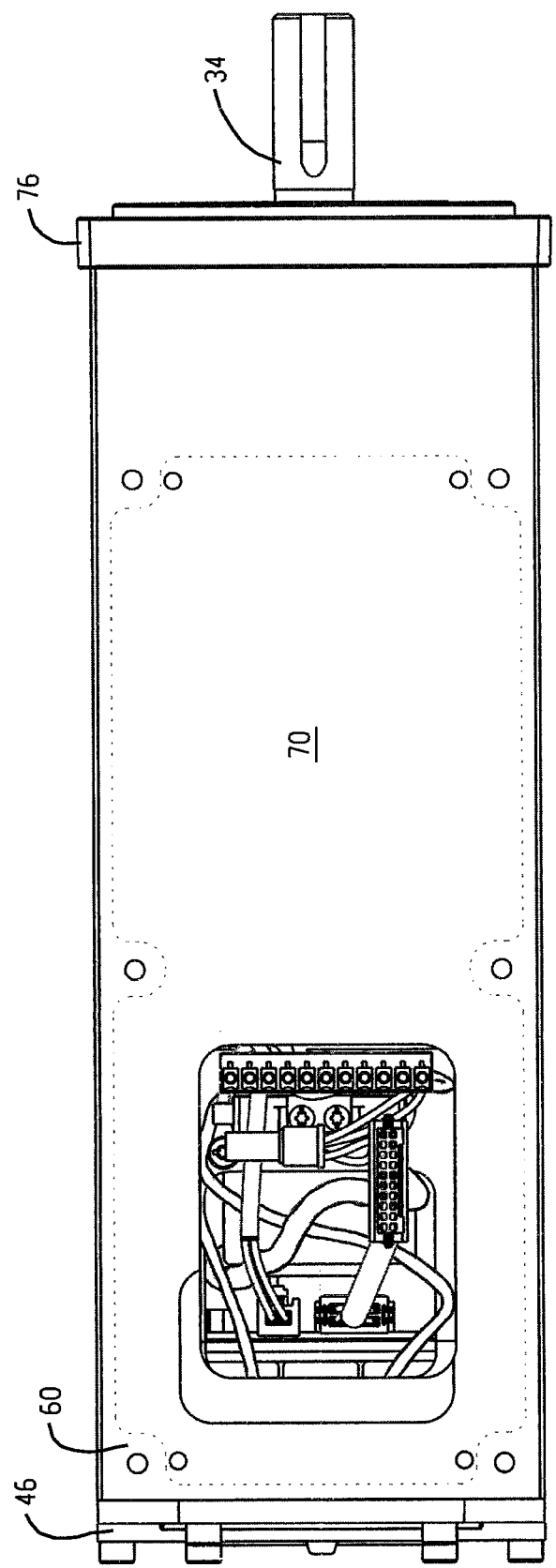
FIG. 5 is a top view of the motor housing portion of the motor assembly of FIG. 2.

Turning to FIG. 4, which is a cross-sectional view taken through the output shaft 34 of the housing portion of the assembly 30, the details of the internal construction of the assembly and, in particular, the bearing support 36, will be described. Beginning with the right hand side of the housing 32, the motor 72 and output shaft 34 are supported within the cavity of the housing 32. As will be appreciated, the motor 72 can be any suitable motor, and the output shaft 34 can include a key 73 for rotationally coupling the output shaft with a component to be driven (not shown). The output shaft 34 is supported for rotation relative to the housing by a bearing 74, which is in turn supported by a stator end cap 76 that is bolted or otherwise secured to the housing 32. A retainer ring 78 secures the bearing 74 in place, while a shaft seal 80 seals out dirt and/or moisture.

The opposite end of the output shaft 34 is supported near a midpoint of the housing 32 by the rear bearing 38. Bearing 38 is itself supported by the bearing support 36, which includes a support housing that is closely received within the tubular housing 32. Bearing 38 is generally supported at a first (inner) axial end of the bearing support 36 and is generally axially coextensive with middle portion of the housing 32. The opposite axial (outer) end of the bearing support includes flange 52 that is bolted or otherwise secured to the tubular housing 32.

It should be appreciated that the bearing support 36 further includes an electronics cavity 84 in which electronic components, for example components 44, are mounted. Cables connect the motor 72, encoder 42, brake 40 and/or components 44 with each other and with the electronics module 58 via opening 64.

It should be appreciated that the present disclosure eliminates external component-to-component assembly seams between coupled packaging hardware that would inhibit the creation and maintenance of, for example, IP 66 and/or 67 seals, while utilizing existing components such as the motor shaft rear bearing and/or output shaft, etc. For example, the bearing support is a structural "cup" that can be inserted into the rear of the housing, pressed onto the output shaft of the motor, and bolted to the rear surface of the housing as described. Aligned openings within the bearing support and secondary/ancillary electronic hardware mounting surface on the housing allow electrical interconnectivity between the motor and the externally attached secondary/ancillary electronic hardware. Additional interface features between the secondary/ancillary electronic hardware and the motor frame (e.g. heat sinks) reside inside the protection of IP seal and offer greater marketability and extended functional longevity.

As used herein, the term tubular is intended to include housings and/or other components that are hollow or have a hollow portion thereof, regardless of the cross-sectional shape of the components. That is, the component need not necessarily be tube shape (e.g. cylindrical) overall, or have a tube shape cavity. Other shapes are possible and are within the scope of this disclosure.

The exemplary embodiment has been described with reference to the preferred embodiments. Modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A motor assembly comprising:
   a tubular motor housing having an interior chamber extending between first and second ends, the tubular motor housing having an opening in an exterior surface thereof;
   a motor unit received in a first end of the chamber, the motor including an output shaft having opposite axial ends, with at least one of the axial end of the output shaft terminating within the housing;
   a bearing support received in the second end of the chamber, the bearing support including a bearing supporting the axial end of the output shaft terminating within the housing, the bearing being spaced axially inward from the second end of the chamber; and
   an electronics module supported on an exterior surface of the housing;
   wherein the housing includes an external flange extending along a major portion of a length thereof, the flange having a continuous planar sealing surface surrounding the opening and including a heat transfer material supported thereon adjacent the opening, the opening extending from an exterior of the housing to the interior chamber through which the electronics module extends for connection to at least one of the motor or the bearing support, the continuous planar sealing surface adapted to interface with a corresponding sealing surface of the electronics module to form a seal therebetween surrounding the opening and the heat transfer material, whereby the opening and the heat transfer material is shielded from contaminants.

2. A motor assembly as set forth in claim 1, further comprising a sealing element interposed between the housing and the electronics module.

3. A motor assembly as set forth in claim 2, wherein the seal is IP 66 or IP 67 rated.

4. A motor assembly as set forth in claim 1, further comprising a sealing element interposed between the bearing and the housing.

5. A motor assembly as set forth in claim 1, wherein the motor includes an electric motor.

6. A motor assembly as set forth in claim 1, wherein the housing includes a plurality of longitudinally extending grooves on an exterior surface thereof.

7. A motor assembly as set forth in claim 1, wherein the electronics module is fixed to the housing with at least one fastener.

8. A motor assembly as set forth in claim 1, wherein the housing is at least one of a die-cast metal, a forged metal, or a machined metal.

9. A motor assembly as set forth in claim 1, wherein the bearing support is tubular and closely received within the housing, the bearing being supported at a first end of the bearing support, and the bearing support further comprising an electronics cavity in which electronic components can be mounted.

10. A motor assembly as set forth in claim 1, wherein the bearing is axially coextensive with a middle portion of the tubular housing.

11. A motor assembly as set forth in claim 1 wherein the motor is a servo motor.

12. A modular motor assembly comprising:
    a housing having first and second open ends and an exterior flange extending between the first and second open ends, an opening in the flange extending to an interior of the housing:
    a motor module supported in the housing and enclosing the first open end of the housing, the motor module having a surface abutting the first open end of the housing adjacent the housing flange, the motor module including an output shaft supported for rotation;
    a bearing support received in the housing and enclosing the second end of the housing, the bearing support having a flange for abutting the second open end of the housing adjacent the housing flange, the bearing support having a bearing supporting an axial end of the output shaft within the housing;
    an electronics module supported on the flange of the housing;
    a sealing element interposed between the housing and the electronics module, the sealing element adapted to seal against an outer peripheral edge of the flange of the housing such that a major portion of the flange is within the sealing element; and
    a heat transfer material between the flange of the housing and the electronics module fully surrounded by the sealing element, whereby the heat transfer material and the opening are shielded from contaminants by the sealing element;
    wherein the electronics module is coextensive with the flange of the housing.

13. A modular motor assembly as set forth in claim 12, wherein the seal is IP 66 or IP 67 rated.

14. A motor assembly comprising:
    a tubular motor housing having an interior chamber extending between first and second ends open end thereof, the tubular motor housing having a planar flange extending along a length thereof between the first and second open ends, the planar flange defining a sealing surface and having an opening extending to the interior chamber, the opening being spaced apart from the first and second ends of the housing such that the sealing surface is continuous about the opening;

a motor unit received in a first end of the chamber, the motor including an output shaft having opposite axial ends, with at least one of the axial ends of the output shaft terminating within the housing, the motor unit enclosing the first open end;

a bearing support received in the second end of the chamber, the bearing support including a bearing supporting the axial end of the output shaft terminating within the housing, the bearing being spaced axially inward from the second end of the chamber, the bearing support being tubular with the bearing being supported at a first end thereof, the bearing support further including an electronics cavity aligned with the opening in the flange;

an electronics module supported on the flange of the housing, the electronics module having a length and a width corresponding to the flange such that the flange and electronics module are coextensive; and a sealing member for sealing a periphery of the flange to the electronics module;

wherein a heat transfer material is interposed between the electronics module and the flange within the sealing member such that the heat transfer material is shielded from contaminants.

* * * * *